(12) United States Patent
Sugiyama

(10) Patent No.: US 6,608,728 B1
(45) Date of Patent: Aug. 19, 2003

(54) MAGNETIC DISK UNIT

(75) Inventor: Hiroshi Sugiyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/527,533

(22) Filed: Mar. 16, 2000

(30) Foreign Application Priority Data

Jul. 6, 1999 (JP) .......................................... 11-192314

(51) Int. Cl.⁷ ................................................ G11B 5/09
(52) U.S. Cl. .......................................... 360/66; 360/46
(58) Field of Search ............................. 360/66, 67, 75, 360/46

(56) References Cited

U.S. PATENT DOCUMENTS 6,069,761 A * 5/2000 Stupp .......................... 360/25
6,111,715 A * 8/2000 Tsuchiya et al. .............. 360/61
6,262,858 B1 * 7/2001 Sugiyama et al. ............ 360/46

FOREIGN PATENT DOCUMENTS

JP 9081909 3/1997

* cited by examiner

Primary Examiner—Regina N. Holder
Assistant Examiner—Varsha A. Kapadia
(74) Attorney, Agent, or Firm—Greer, Burns & Crain, Ltd.

(57) ABSTRACT

A magnetic disk unit includes a housing which accommodates a magneto-resistive element and a magnetic disk, a temperature sensor for detecting a temperature within the housing, a circuit for detecting a resistance value of the magneto-resistive element, and a current control unit for controlling a sense current which is supplied to the magneto-resistive element, based on the detected temperature detected and the detected resistance value.

7 Claims, 4 Drawing Sheets

MAGNETIC DISK UNIT

BACKGROUND OF THE INVENTION

1. Field of the Invention

The present invention generally relates to magnetic disk units, and more particularly to a magnetic disk unit which is provided with a head having a magneto-resistive (MR) element.

Recently, in magnetic disk units, a MR element is used as a reproducing head because of the high output obtainable thereby. A resistance of the MR element changes depending on the magnetic information recorded on a magnetic disk. The information recorded on the magnetic disk is reproduced by detecting the change in the resistance of the MR element by supplying a sense current to the MR element.

2. Description of the Related Art

In a conventional magnetic disk which uses the MR element, the sense current is set so that a predetermined characteristic and a desired serviceable life are obtained under a high temperature environment, from the point of view of the serviceable life of the MR element. Normally, the sense current which is set in this manner is fixed when forwarding the magnetic disk unit.

In other words, in the conventional magnetic disk unit, the sense current is suppressed and set to satisfy a guaranteed serviceable life of the magnetic disk unit even under the high temperature environment, so that the MR element satisfies the guaranteed serviceable life of the magnetic disk unit.

In the conventional magnetic disk unit, it is thus possible, at room temperature or under a low temperature environment, to supply a sense current which is larger than the sense current which is set as described above. However, the sense current is suppressed and set to satisfy the guaranteed serviceable life of the magnetic disk unit under the high temperature environment, and there was a problem in that the original performance of the MR element is not fully utilized.

SUMMARY OF THE INVENTION

Accordingly, it is a general object of the present invention to provide a novel and useful magnetic disk unit in which the problem described above is eliminated.

Another and more specific object of the present invention is to provide a magnetic disk unit which controls a sense current supplied to a MR element, so that a desired serviceable life of the magnetic disk unit is obtained and the original performance of the MR element is fully utilized.

Still another object of the present invention is to provide a magnetic disk unit comprising a housing which accommodates a magneto-resistive element and a magnetic disk, temperature detecting means for detecting a temperature within the housing, resistance detecting means for detecting a resistance value of the magneto-resistive element, and current control means for controlling a sense current which is supplied to the magneto-resistive element, based on the temperature detected by the temperature detecting means and the resistance value detected by the resistance detecting means. According to the magnetic disk unit of the present invention, it is possible to control the sense current which is supplied to the magneto-resistive element so that a desired guaranteed serviceable life of the magnetic disk unit is obtained and the original performance of the magneto-resistive element can be fully utilized.

Other objects and further features of the present invention will be apparent from the following detailed description when read in conjunction with the accompanying drawings.

DESCRIPTION OF THE PREFERRED EMBODIMENTS

Figure 1:
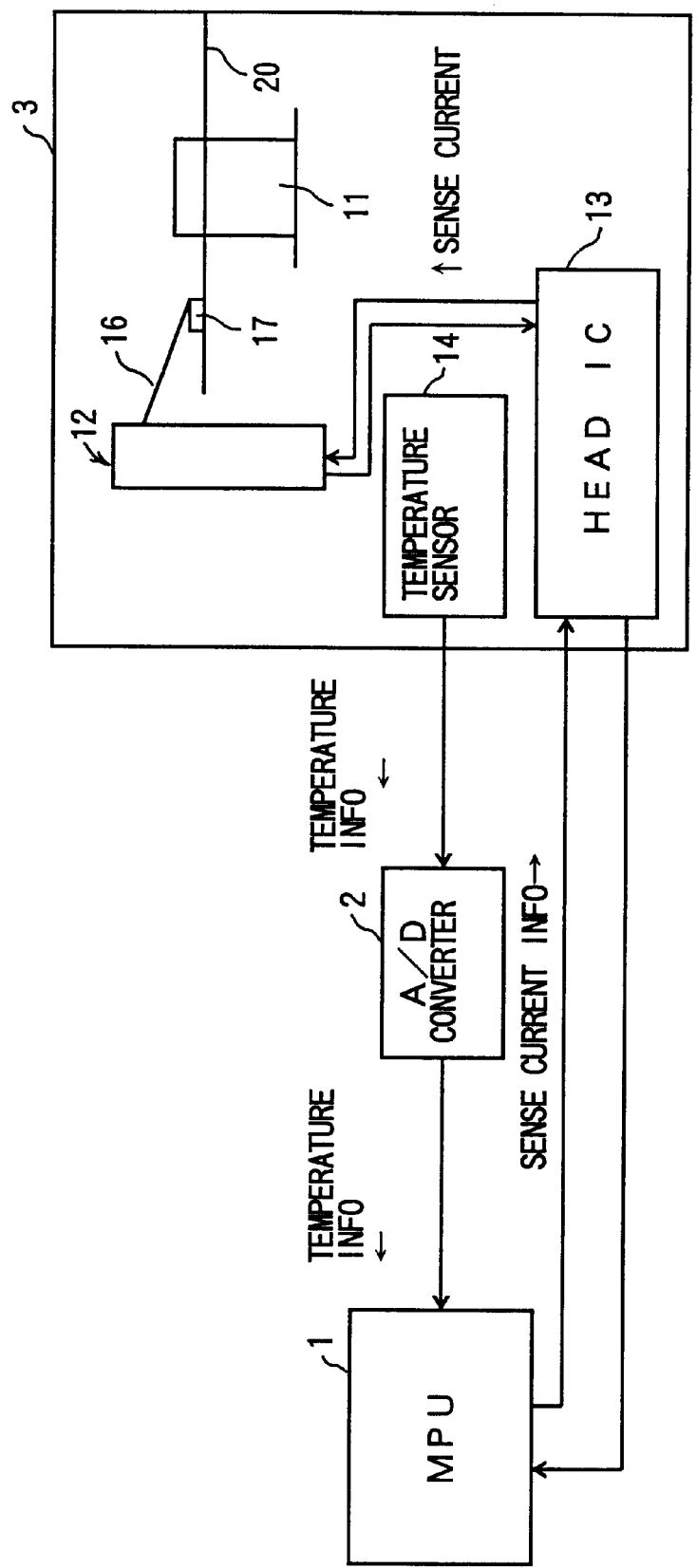
FIG. 1 is a system block diagram showing an important part of an embodiment of a magnetic disk unit according to the present invention.

FIG. 1 is a system block diagram showing an important part of an embodiment of a magnetic disk unit according to the present invention. The magnetic disk unit shown in FIG. 1 generally includes an MPU 1, an analog-to-digital (A/D) converter 2, and a disk enclosure 3. A hub 11, a pickup part 12, a head IC 13, a temperature sensor 14 and the like are provided within the disk enclosure 3. One or a plurality of magnetic disks (only one shown) 20 are fixed to the hub 11 and is rotated by a motor (not shown) using a known means. The pickup part 12 includes an arm 16, a head 17 provided on a tip end of the arm 16, and the like. In this embodiment, the head 17 includes a reproducing head portion which is made up of a magneto-resistive (MR) element, and a recording head portion which is made up of an inductive element.

Figure 2:
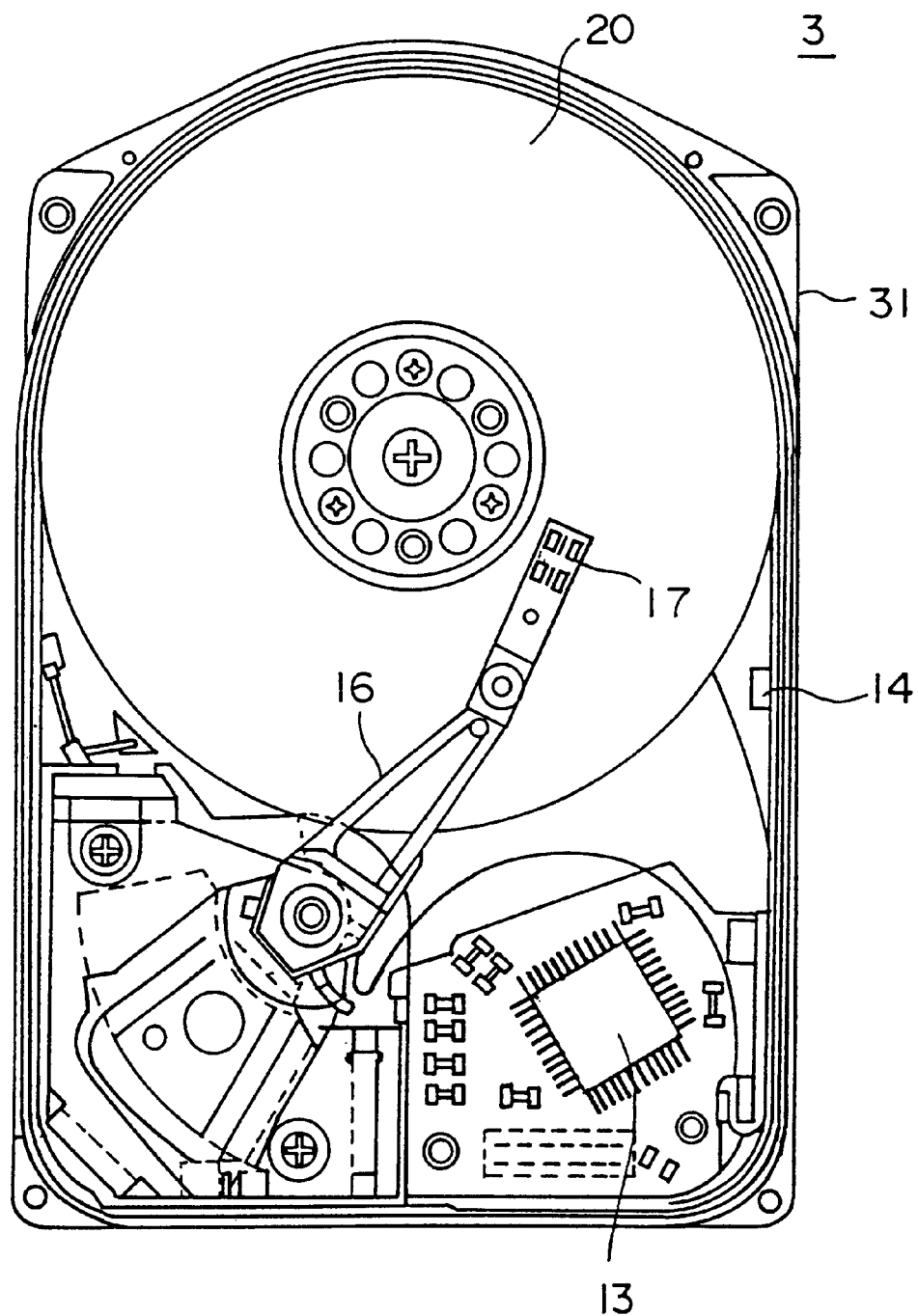
FIG. 2 is a plan view showing a disk enclosure in a state where a lid thereof is removed.

FIG. 2 is a plan view showing the disk enclosure 3 in a state where a lid thereof is removed. In FIG. 2, those parts which are the same as those corresponding parts in FIG. 1 are designated by the same reference numerals, and a description thereof will be omitted. In FIG. 2, a reference numeral 31 indicates a housing of the disk enclosure 3.

The MPU 1 is provided to control the general operation of the magnetic disk unit. The A/D converter 2 converts a temperature detection signal output from the temperature sensor 14 which detects the temperature within the housing 31 into a digital signal, and inputs this digital signal to the MPU 1. The head IC 13 has a function of supplying a sense current to the MR element of the head 17 reading a resistance value of the MR element at the time of the reproduction (read), and a function of supplying a current which is received from the MPU 1 and is dependent on recording information which is to be recorded to the inductive element of the head 17 at the time of the recording (write). The head IC 13 also has a known function of driving the arm 16 depending on an address supplied from the MPU 1, but this known function is not directly related to the subject matter of the present invention, and a detailed description thereof will be omitted in this specification.

This embodiment is characterized in that the temperature sensor 14 is provided within the disk enclosure 3, and that the MPU 1 controls the sense current. Accordingly, the basic construction of the magnetic disk unit, excluding the temperature sensor 14, is not limited to that shown in FIGS. 1 and 2, and this embodiment is of course similarly applicable to magnetic disk units having various other constructions.

Figure 3:
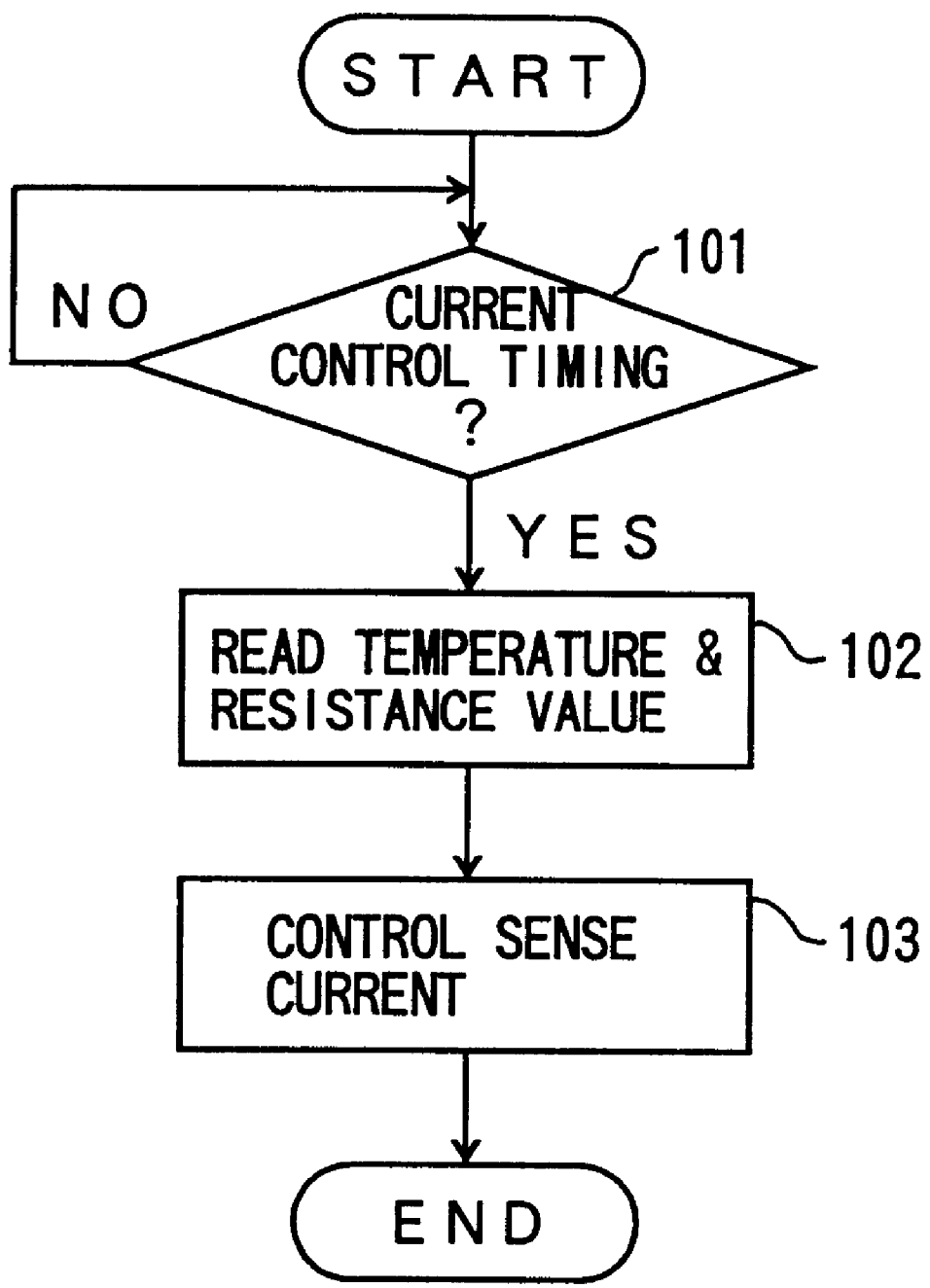
FIG. 3 is a flow chart for explaining the operation of the embodiment of the magnetic disk unit.

Next, a description will be given of the operation of this embodiment, by referring to FIG. 3. FIG. 3 is a flow chart for explaining the operation of this embodiment, and corresponds to the process carried out by the MPU 1 shown in FIG. 1.

In FIG. 3, a step 101 decides whether or not it is the timing for controlling the sense current. More particularly, the step 101 decides (a) whether or not it is an arbitrary timing set by the MPU 1 or by a host unit (not shown) which is coupled to the MPU 1, (b) whether or not a predetermined time has elapsed, (c) whether or not a read error is detected a predetermined number of times, or the like. In the case (b), the sense current can be controlled for every predetermined time, to suit the needs of the magnetic disk unit. The read error can be detected by the head IC 13 and/or the MPU 1 using a known method, and the detected read error can be counted by an internal counter of the MPU 1, for example. In the case (c), it is possible to determine the control timing of the sense current depending on the needs of the magnetic disk unit.

If the decision result in the step 101 is NO, the process returns to this step 101. On the other hand, if the decision result in the step 101 is YES, a step 102 reads the detected temperature which is obtained from the temperature sensor 14 via the A/D converter 2, and the resistance value of the MR element obtained via the head IC 13.

A step 103 controls the sense current which is supplied to the MR element of the head 17 via the head IC 13, based on the detected temperature and resistance value, and the process ends. More particularly, the step 103 controls the sense current according to one of the following procedures [A] through [C], for example.

Procedure [A]:

According to this procedure, if the temperature detected by the temperature sensor 14 is less than or equal to a predetermined temperature, the sense current is controlled and set to a value which is larger than that of the sense current which is set when the detected temperature is greater than the predetermined temperature. In this case, it is possible to fully utilize the original performance of the MR element.

Procedure [B]:

According to this procedure, the MPU 1 is provided with a table which stores a difference (or error) current with respect to a predetermined sense current, for each temperature and each resistance value. The difference current corresponding to the temperature which is detected by the temperature sensor 14 and corresponding to the resistance value detected via the head IC 13, is read from this table and added to the predetermined sense current. The sense current is controlled so that, a sense current which is a sum of the difference current and the predetermined sense current is supplied to the MR element. In this case, it is possible to appropriately control the sense current using a relatively simple circuit construction.

Procedure [C]:

According to this procedure, the sense current is controlled so that a sense current Is described by the following function is supplied to the MR element, where T denotes the temperature detected by the temperature sensor 14, MRR denotes the resistance value detected via the head IC 13, and c1 through c6 denote constants.

$$Is = A * MRR^B$$

$$A = c1*T^2 + c2*T + c3$$

$$B = c4*T^2 + c5*T + c6$$

In this case, it is also possible to appropriately control the sense current using a relatively simple circuit construction.

A servo frame part is provided on the magnetic disk 20, and a servo signal which is used to make the head 17 follow the track on the magnetic disk 20 is recorded in this servo frame part. Hence, in a modification of this embodiment, it is possible to set the sense current to an initial value when reading the servo frame part.

Figure 4:
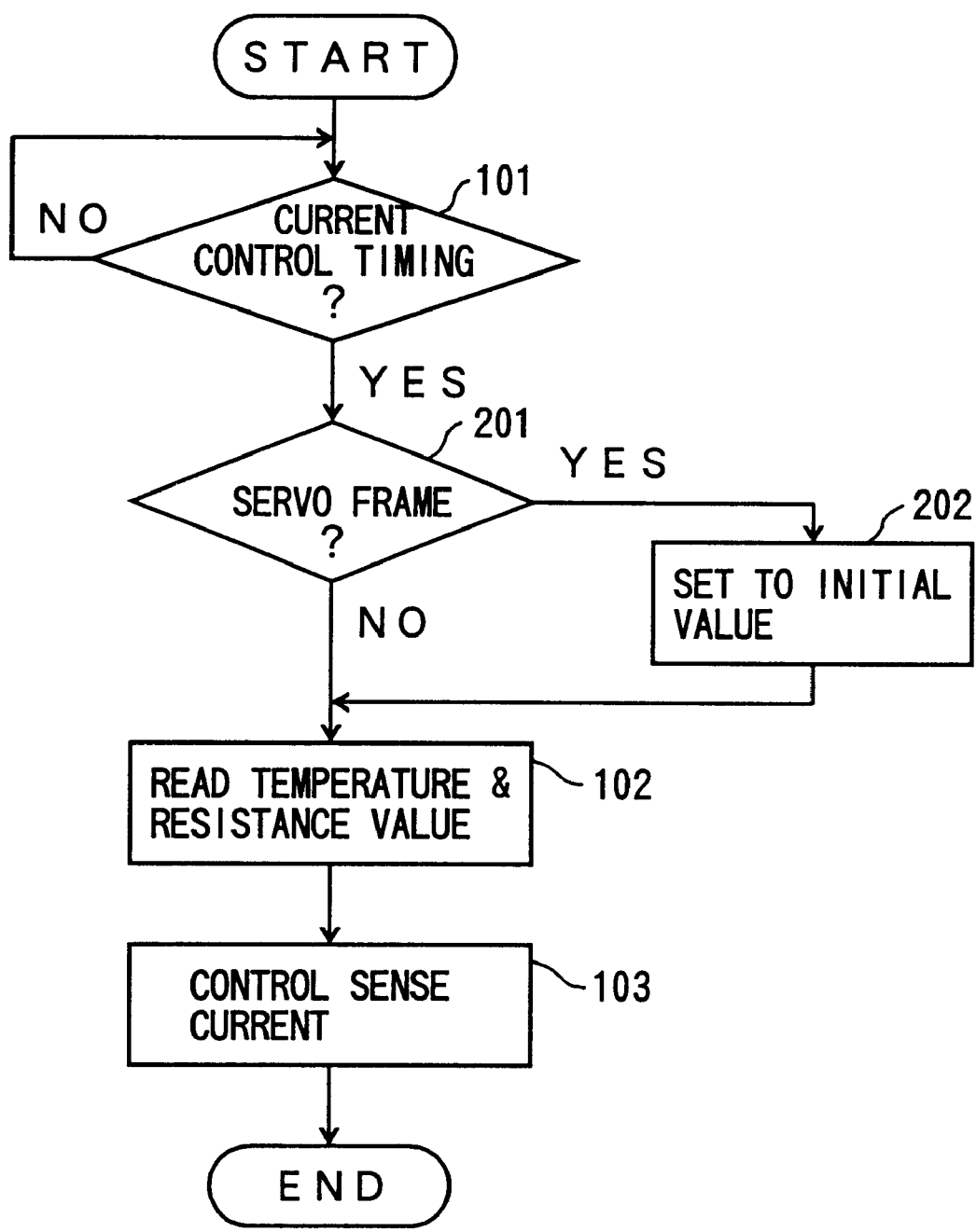
FIG. 4 is a flow chart for explaining the operation of a modification of the embodiment of the magnetic disk unit.

FIG. 4 is a flow chart for explaining the operation of this modification of the embodiment. In FIG. 4, those steps which are the same as those corresponding steps in FIG. 3 are designated by the same reference numerals, and a description thereof will be omitted.

In FIG. 4, a step 201 decides whether or not the servo frame is read, by a known method. If the decision result in the step 201 is YES, a step 202 sets the sense current to an initial value. This initial value is a theoretical optimum value which is obtained in advance. If the decision result in the step 201 is NO or after the step 202, the process advances to the step 102.

According to this modification of the embodiment, it is possible to set the sense current in an initial state to the initial value which is a theoretical optimum value obtained in advance.

In the embodiment and modification described above, the MPU 1 and the A/D converter 2 are provided outside the disk enclosure 3. However, the magnetic disk unit may of course have a construction in which the MPU 1 and the A/D converter 2 are provided within the disk enclosure 3. In addition, depending on the kind of disk enclosure, the disk enclosure may be provided with an internal CPU. If the disk enclosure is provided with an internal CPU, the operation of the MPU 1 described above in conjunction with FIGS. 3 and 4 may be carried out by the internal CPU.

Some existing magnetic disk units are provided with a temperature sensor. In such magnetic disk units, the characteristic of the circuit within the head IC, the input and output waveforms of the head and the like are adjusted depending on the temperature which is detected by the temperature sensor. In a case where the present invention is applied to such magnetic disk units, it is possible to use the existing temperature sensor in common as the temperature sensor 14, and it is unnecessary to additionally provide another temperature sensor. Hence, in this case, it is simply necessary to modify the operation of the MPU 1 in order to control the sense current according to the present invention, and there is no need to modify the hardware construction of the existing magnetic disk unit.

Further, the present invention is not limited to these embodiments, but various variations and modifications may be made without departing from the scope of the present invention.

What is claimed is:

1. A magnetic disk unit comprising:
    a housing which accommodates a magneto-resistive element and a magnetic disk;
    temperature detecting means for detecting a temperature within the housing;
    resistance detecting means for detecting a resistance value of the magneto-resistive element; and
    current control means for controlling a sense current which is supplied to the magneto-resistive element, based on the temperature detected by the temperature detecting means and the resistance value detected by the resistance detecting means,
    said current control means supplying to the magneto-resistive element a sense current Is which is described by the following function, $$Is = A * MRR^B$$

$$A = c1*T^2 + c2*T + c3$$

$$B = c4*T^2 + c5*T + c6$$

where T denotes the temperature detected by the temperature detecting means, MRR denotes the resistance value detected by the temperature detecting means, and c1 through c6 denote constants.

2. The magnetic disk unit as claimed in claim 1, wherein, if the temperature detected by the temperature detecting means is less than or equal to a predetermined temperature, said current control means sets the sense current to a value which is larger than that of the sense current which is set when the temperature detected by the temperature sensor is greater than a predetermined temperature.

3. The magnetic disk unit as claimed in claim 1, wherein said current control means includes a table which stores a difference current with respect to a predetermined sense current, for each temperature and each resistance value, and said current control means reads the difference current from the table depending on the temperature detected by the temperature detecting means and the resistance value detected by the resistance detecting means and supplies to the magneto-resistive element a sense current which is a sum of the difference current read from the table and the predetermined sense current.

4. The magnetic disk unit as claimed in claim 1, wherein said current control means controls the sense current for every predetermined time.

5. The magnetic disk unit as claimed in claim 1, wherein said current control means controls the sense current when a read error is detected a predetermined number of times.

6. The magnetic disk unit as claimed in claim 1, which further comprises:
- a head which includes the magneto-resistive element;
- a servo frame part provided on the magnetic disk; and
- a servo signal for making the head follow a track on the magnetic disk, the servo signal being recorded in the servo frame part wherein said current control means sets the sense current to an initial value when reading the servo frame part.

7. A magnetic disk unit comprising:
- a housing which accommodates a magneto-resistive element and a magnetic disk;
- a temperature sensor detecting a temperature within the housing;
- a resistance detecting circuit detecting a resistance value of the magneto-resistive element; and
- a current control circuit controlling a sense current which is supplied to the magneto-resistive element, based on the temperature detected by the temperature sensor and the resistance value detected by the resistance detecting circuit, said current control circuit supplying to the magneto-resistive element a sense current Is which is described by the following function, $$I_s = A * MRR^B$$

$$A = c1 * T^2 + c2 * T + c3$$

$$B = c4 * T^2 + c5 * T + c6$$

where T denotes the temperature detected by the temperature sensor, MRR denotes the resistance value detected by the temperature detecting sensor, and c1 through c6 denote constants.

* * * * *